United States Patent [19]

McConnell et al.

[11] 4,146,586

[45] Mar. 27, 1979

[54] POLYESTER/SUBSTANTIALLY AMORPHOUS POLYOLEFIN HOT-MELT ADHESIVE BLENDS

[75] Inventors: Richard L. McConnell; Jimmy R. Trotter; Frederick B. Joyner, all of Kingsport, Tenn.

[73] Assignee: Eastman Kodak Company, Rochester, N.Y.

[21] Appl. No.: 813,378

[22] Filed: Jul. 6, 1977

[51] Int. Cl.$^2$ .................... C08L 67/00; C08L 67/02; C08L 67/06
[52] U.S. Cl. .................................................. 260/873
[58] Field of Search ........................................ 260/873

[56] References Cited

U.S. PATENT DOCUMENTS

| | | | |
|---|---|---|---|
| 3,397,169 | 8/1968 | Wilkenson | 260/873 |
| 3,657,389 | 4/1972 | Caldwell et al. | 260/873 |
| 3,701,760 | 10/1972 | Hagemeyer et al. | 526/19 |
| 3,728,212 | 4/1973 | Caldwell et al. | 260/873 |
| 3,923,726 | 12/1975 | Benz | 260/873 |
| 3,944,516 | 3/1976 | Petke | 260/873 |
| 3,966,841 | 6/1976 | Combs | 260/873 |
| 3,969,294 | 7/1976 | Papeuchado | 260/873 |
| 3,970,709 | 7/1976 | Owston | 260/873 |
| 3,980,735 | 9/1976 | Kosaka et al. | 260/873 |

*Primary Examiner*—Allan Lieberman
*Attorney, Agent, or Firm*—Clyde L. Tootle; Daniel B. Reece, III

[57] ABSTRACT

This invention relates to blends of polyesters and substantially amorphous polyolefins such as amorphous polypropylene. Even small amounts of substantially amorphous polypropylene (5-10 weight percent) substantially lowers the melt viscosity of polyesters at application temperatures and reduces the temperature required for application of the adhesive blend without deleteriously affecting the bond strengths normally achieved on many substrates including fabrics, plastics, and metals. Blends of polyesters and 5-10% substantially amorphous polyolefins are also non-tacky and can be pelletized and used as pellets without difficulty.

7 Claims, No Drawings

POLYESTER/SUBSTANTIALLY AMORPHOUS POLYOLEFIN HOT-MELT ADHESIVE BLENDS

This invention relates to polyester/substantially amorphous polyolefin blends which have much lower melt viscosities than the polyesters alone and which are useful as hot-melt adhesives.

Many polyesters have useful properties as hot-melt adhesives for the bonding of various substrates including metals, fabrics, and plastics. However, in order to obtain high bond strength on these substrates, it is necessary to use high molecular weight polyester materials. For example, the I.V. of polyesters used is normally in the range of about 0.5 up to about 1.4. These high molecular weight polyesters, therefore, have very high melt viscosities at the temperatures at which they must be applied to the substrates. These high viscosities are deleterious in that they make the adhesive difficult to apply and, in many cases, the polymer melt does not wet-out the substrate sufficiently. It has now been found that certain amorphous polyolefins such as amorphous polypropylene can be melt-blended with polyester adhesive materials to substantially lower their melt viscosities without deleteriously affecting their bonding strengths.

In accordance with the present invention, we have found that a blend comprising at least one substantially amorphous olefin polymer such as amorphous polypropylene, amorphous poly-1-butene, poly(propylene-co-higher 1-olefin), and a polyester provides a hot-melt adhesive having a novel combination of properties including good wet-out on a wide variety of substrates, provides good bond strength, and maintains a good bond strength over a wide variety of end-use conditions.

According to one aspect of this invention there is provided a hot melt adhesive composition comprising a blend of an amorphous polyolefin and a partially crystalline polyester which has a heat of fusion of about 1 to about 12 calories per gram, a melting point within the range of about 80° C.–225° C., and an inherent viscosity of at least 0.5 and preferably at least 0.6, as measured at 25° C., using 0.50 grams of polyester per 100 ml. of a solvent consisting of 60 percent by volume phenol and 40 percent by volume tetrachloroethane.

The "heat of fusion" $\Delta H_f$ of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in Du Pont Thermal Analysis Bulletin No. 900-8 (1965). Qualitatively, it is possible to compare the degree of crystallinity of polymers by comparing their $\Delta H_f$ values. The melting points of the polymers are also readily determined using Differential Scanning Calorimeters.

The polyesters useful in this invention are well known in the art and can be made by conventional processes. The polyesters are composed of at least one dicarboxylic acid component which can be an aliphatic, alicyclic and aromatic dicarboxylic acid having up to 40 carbon atoms. Examples of such acids include terephthalic, isophthalic, oxalic; malonic; dimethylmalonic; succinic; glutaric; adipic; 2-methyladipic; trimethyladipic; pimelic; 2,2-dimethylglutaric; 3,3-diethylsuccinic; azelaic, sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic (hexahydroterephthalic); phthalic; 4-methylisophthalic; t-butylisophthalic; 2,5-norbornanedicarboxylic; 1,4-naphthalenedicarboxylic; 2,5-naphthalenedicarboxylic; 2,6-naphthalenedicarboxylic; 2,7-naphthalenedicarboxylic acids, dimer acid, and the like. It will be understood that the corresponding esters of terephthalic acid and the above acids, such as dimethyl esters, are included in the term "dicarboxylic acid". In a preferred aspect of this invention, the dicarboxylic acid component is terephthalic acid.

In this invention the polyester is also prepared from a diol component which can be, for example, ethylene glycol, tetramethylene glycol or 1,4-cyclohexanedimethanol and the like as well as other diol components which can be an aliphatic or alicyclic diol having up to 120 carbon atoms. Examples of such diols include ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 3-ethyl-2-isobutyl-1,3-propanediol; 1,3-butanediol; 1,4-butanediol; 1,4-butenediol; 1,5-pentanediol, 1,6-hexanediol; 1,10-decanediol; 2,2,4-trimethyl-1,6-hexanediol; 1,4-cyclohexanedimethanol; 1,2-cyclohexanedimethanol, 1,3-cyclohexanedimethanol, polytetramethylene glycol, polyoxyethylene glycol, polyoxypropylene glycol, polyoxybutene glycol, poly(oxyethylene-co-oxy propylene glycol) and the like. In a preferred embodiment the diol can be ethylene glycol, 1,4-butanediol or 1,4-cyclohexanedimethanol.

The polyesters useful in this invention can be prepared by processes well known in the art. For example, the polyesters can be prepared by direct condensation or ester interchange. Preferably the polyesters are prepared by ester interchange. According to this method, the dicarboxylic acid is reacted with an alcohol to form a diester, such as dimethyl terephthalate, and the diester is ester interchanged with a diol to form a bis ester, such as bis 2-hydroxyethyl terephthalate, and the ester interchange product is polycondensed at low pressure and high temperature to form a high molecular weight polyester.

One type of polyester of this invention may be prepared by standard procedures well known to those skilled in the art. See, for example, British Pat. No. 1,047,072. For example, these copolyesters may be prepared by employing such amounts of terephthalic acid, adipic acid, ethylene glycol and 1,4-butanediol according to such polymerization conditions as will result in the production of a copolyester in which the mole ratio of terephthalic acid to adipic acid will be within the range of 60:40 to 80:20, the range of ethylene glycol to 1,4-butanediol will be in the range of 60:40 to 80:20, and the inherent viscosity (I.V.) will be at least about 0.5, preferably at least 0.6. It has been found that the higher the I.V. of the copolyester material, the greater the bond strength will be resulting from its use in laminating fabrics and other substrates, as revealed by the so-called "Peel-Test", the details of which are described hereinafter. In general, the copolyesters of this invention in which the mole ratios of terephthalic acid to adipic acid are within the range of 60:40 to 80:20 and ethylene glycol to 1,4-butanediol within the range of 60:40 to 80:20 are characterized by melting points ranging from about 80° C. to about 158° C.

The mole ratio of terephthalic acid to adipic acid, ethylene glycol to 1,4-butanediol, the softening temperature and the I.V. of several typical compositions are listed in the following tabulation:

|  | Mole Percent of Acid and Glycol Components | | | |
| --- | --- | --- | --- | --- |
| Copolyester | Terephthalic Acid/Adipic Acid | Ethylene Glycol/1,4-Butanediol | Melting Point, °C | I.V. |
| 1 | 60:40 | 60:40 | 80–85 | 1.27 |
| 2 | 70:30 | 70:30 | 130–135 | 1.09 |
| 3 | 80:20 | 80:20 | 153–158 | 1.16 |

While we have referred to terephthalic acid and adipic acid, derivatives of such acids can be employed, if desired. Examples of such derivatives are the acids, anhydrides, esters and acid chlorides of such acids. For example, dimethyl terephthalate may be employed in place of terephthalic acid and dimethyl adipate can be used in place of adipic acid. Additives or pigments such as titanium dioxide or sodium stearate may also be introduced into the polymerization mixture in which the copolyester is produced.

The substantially amorphous polyolefin useful in this invention is an essentially noncrystalline polyolefin, such as the hexane-soluble polypropylene, formed in minor amounts during the production of crystalline polypropylene by the polymerization of propylene in the presence of stereospecific catalysts by a process such as disclosed in U.S. Pat. No. 3,679,775, incorporated herein by reference. The solid substantially amorphous polypropylene has a viscosity of about 100 to about 50,000 centipoise at 190° C. (measured in a Sieglaff-McKelvey Rheometer manufactured by the Tinuis Olsen Testing Machine Company, Willow Groove, Pa.,) and preferably from about 1,000 to about 30,000 centipoise. The substantially amorphous polyolefin can also be blended with up to 30 weight percent of low-viscosity crystalline, polyolefin. One commercially available amorphous polyolefin useful in the present invention is Eastobond M-5 polypropylene available from Eastman Chemical Products, Inc. The substantially amorphous polypropylene component is present in the adhesive compositions of this invention in an amount of about 1 percent to about 20 percent by weight of the blend, and preferably about 2 percent to about 15 percent by weight. Another substantially amorphous polyolefin component which can also be used is a propylene-alpha-monoolefin copolymer or a poly(propylene-co-higher 1-olefin). These substantially amorphous copolymers are formed in varying amounts during the production of crystalline propylene-alpha-monoolefin copolymers by stereospecific polymerization or propylene and a different alpha-monoolefin by a process as disclosed in U.S. Pat. No. 3,529,037, incorporated herein by reference. These substantially amorphous copolymers can also contain various amounts of low-viscosity crystalline polymer up to an amount of about 30 weight percent. These amorphous polymers can also be produced directly, i.e., without production of crystalline copolymer by polymerizing, for example, a mixture of propylene and 1-butene or propylene and 1-hexene in mineral spirits at a temperature of about 100° C. to about 180° C. and a pressure in the range of about atmospheric to about 2,000 psig. with the catalyst containing an organopolylithium aluminum compound and the HA or AA forms of titanium trichloride in a mole ratio of 0.01–0.50/0.1–1.0/1 by a polymerization process as disclosed in U.S. Pat. No. 3,679,775 which disclosure is incorporated herein by reference. Methods of preparation of the organopolylithium aluminum compounds are also disclosed in U.S. Pat. No. 3,679,775. Another example of amorphous copolymers useful in the present invention is amorphous propylene-butene copolymers containing from about 30 percent to about 75 weight percent of 1-butene, and having a melt viscosity of about 100 to 50,000 centipoise at 190° C., a solubility in refluxing hexane of at least 99 weight percent, a solubility in refluxing diethyl ether of at least 60 weight percent, a ring and ball softening point in the range of about 78 to 120° C., and a differential scanning calorimeter melting point not greater than 120° C. The amorphous polyolefin can be modified or reacted with maleic anhydride or acrylic acid, for example, and can also be degraded to the desired melt viscosity if one starts with a high molecular weight substantially amorphous polymer.

The poly(propylene-co-higher 1-olefin) useful in the present invention is a substantially amorphous propylene/higher 1-olefin copolymer containing 35 to 65 mole percent higher 1-olefin having a melt viscosity range at 190° C. of about 100 to about 50,000 cp., a density of about 0.85 to 0.86, a glass transition temperature (Tg) of about −30 to −45° C., and a weak endotherm at about 40–45° C. may sometimes be detected by Differential Scanning Calorimetry, wherein said higher 1-olefin is a member of the group consisting of 1-hexene, 1-heptene, 1-octene, 1-nonene and 1-decene. The 1-butene/higher 1-olefin copolymers containing 35–65 mole percent higher 1-olefin are also useful in the practice of this invention. Such poly(propylene-co-higher 1-olefin) copolymers are disclosed in U.S. Pat. No. 3,954,697.

The adhesive compositions of this invention are prepared by blending together the components in the melt at a temperature of about 180° C. to about 230° C. until a homogeneous blend is obtained. Various methods of blending materials of this type are known to the art and any method that produces a homogeneous blend is satisfactory. These components blend easily in the melt and a heated vessel equipped with a stirrer is often all that is required. For example, a Cowles stirrer provides an effective mixing means for preparing these hot-melt adhesive compositions.

In addition to the above listed components, it is desirable for the hot-melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 220 and 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate), and Ethyl 702 ]4,4'-methylene bis(2,6-di-tert-butylphenol)]. A particularly effective antioxidant is Irganox 1010 which is identified as tetrakis[methylene-3-(3',5'-di-t-butyl-4'-hydroxyphenyl)propionate] methane when used in combination with Cyanox 1212 (American Cyanamid) which is laurylstearyl thiodipropionate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 42.75 grams of copolyester prepared from 75 mole percent dimethyl terephthalate, 25 mole percent adipic acid, 75 mole percent ethylene glycol and 25 mole percent 1,4-butanediol (0.78 I.V., Tm = 140° C.) and about 2.25 grams of a substantially amorphous polypropylene (1500 cp at 190° C.; ring and ball softening point 105° C.) are physically blended under a nitrogen blanket in a Brabender Plastograph (sigma blade mixer) at 190° C. for five minutes. The blend is stabilized against thermal degradation by the addition of 0.2 weight percent Eastman Inhibitor DOPC [2,6-bis(1-methylheptadecyl)p-cresol]. The resulting blend is removed from the Brabender Plastograph, allowed to cool to 23° C., then cut into small convenient pieces, and dried in a vacuum oven at 50° C. At 23° C. the blend is nontacky to the touch. The melt viscosity of the blend is 45,200 cp at 220° C. and $1000^{-1}$ (Sieglaff-McKelvey rheometer). Melt pressed films of the blend (0.005 ± 0.0005 inch thick) are used to bond 65/35 Kodel polyester/cotton fabric (twill weave) using a Sentinel heat sealer at 425° F. (218° C.) and 28 psi for two seconds. The bonded specimens have an initial T-peel strength of 19.0 pounds per inch width (measured) at 23° C. and two inches per minute peel rate 24 hours after bond formation). Similarly good results are achieved using amorphous polypropylene having a melt viscosity of 3000 cp at 190° C. instead of 1500 cp at 190° C.

The melt viscosity of the unmodified copolyester is 90,500 cp at 220° C. and 1000 $sec^{-1}$. Fabric bonds that were made with films (0.005 ± 0.0005 inches thick) of unmodified copolyester have an initial T-peel strength of about 22 pounds per inch width.

EXAMPLE 2

The procedure of Example 1 is repeated except that about 40.5 g. of the copolyester and about 4.5 g of substantially amorphous polypropylene (1500 cp at 190° C.) are used to prepare the blend. This blend has a melt viscosity of 31,500 cp at 220° C. and 1000 $sec^{-1}$. A fabric bond made with a film of this blend on Kodel polyester/cotton fabric has an initial T-peel strength of 14.1 pounds per inch width when heatsealed at 425° F., 28 psi, two seconds, and about 15 pounds per inch when heatsealed at 350° F.

This example shows that the melt viscosity of the copolyester is substantially reduced by the addition of 10 weight percent amorphous polypropylene without causing a drastic reduction in the T-peel strength of fabric bonds.

EXAMPLE 3

The procedure of Example 1 is repeated except that about 42.75 grams of a copolyester containing 70 mole percent dimethyl terephthalate, 30 mole percent adipic acid, 73 mole percent ethylene glycol and 27 mole percent 1,4-butanediol (0.74 I.V., Tm = 125° C.) and about 2.25 grams of substantially amorphous polypropylene (1500 cp at 190° C.); are used to prepare the blend. This blend has a melt viscosity of 40,500 cp at 220° C. and 1000 $sec^{-1}$. A fabric bond made with a film of this blend on Kodel polyester/cotton fabric has a T-peel strength of 11.7 pounds per inch (bond heatsealed at 375° F., 28 psi, and two seconds dwell time). The unmodified copolyester has a melt viscosity of 91,900 cp at 220° C. and 1000 $sec^{-1}$ and a bond T-peel strength of 16.2 pounds per inch.

EXAMPLE 4

The procedure of Example 1 is repeated except 40.50 g of the copolyester described in Example 3 and 4.50 g of substantially amorphous polypropylene (1500 cp at 190° C.) are used to prepare the blend. A melt viscosity of 23,300 cp at 220° C. and 1000 $sec^{-1}$ and bond T-peel strength on Kodel polyester/cotton fabric of 12.1 pounds per inch width (bond heatsealed at 375° F., 28 psi, and two seconds) are obtained.

EXAMPLE 5

The procedure of Example 1 is repeated except that about 42.75 grams of a copolyester based on 57 mole percent dimethyl terephthalate, 35 mole percent hexahydroterephthalic acid, 8 mole percent dimer acid and 1,4-butanediol (1.03 I.V., Tm = 145° C.) and about 2.25 grams substantially amorphous polypropylene (1500 cp at 190° C.) are used to prepare the blend. This blend has a melt viscosity of 105,500 cp at 220° C., and $1000^{-1}$ and a bond T-peel strength on Kodel polyester/cotton fabric of 19.0 pounds per inch width (bond heatsealed at 425° F., 28 psi, and five seconds dwell time). The unmodified copolyester has a melt viscosity of 220,400 cp at 220° C. and 1000 $sec^{-1}$ and a bond T-peel strength on fabric of 19.6 pounds per inch width.

EXAMPLE 6

The procedure of Example 1 is repeated except 40.50 g of the copolyester described in Example 5 and 4.50 g substantially amorphous polypropylene (1500 cp at 190° C.) are used to prepare the blend. A melt viscosity of 68,300 cp at 220° C. and 1000 $sec^1$ and a bond T-peel strength of 13.8 pounds per inch width on Kodel polyester/cotton fabric (bond heatsealed at 425° F., 28 psi, and five seconds) are obtained for this blend.

EXAMPLE 7

The procedure of Example 1 is repeated except that about 42.75 grams of a butylene terephthalate copolyester containing 35 mole percent hexahydroterephthalic acid and 25 weight percent polytetramethylene glycol (MW1000) (1.34 I.V., Tm = 163° C.) and about 2.25 grams of a substantially amorphous polypropylene (1500 cp at 190° C.) are used to prepare the blend. This blend has a melt viscosity of 97,400 cp at 220° C. and 1000 $sec^{-1}$ and a bond T-peel strength on Kodel polyester/cotton fabric of 19.8 pounds per inch width (bond heatsealed at 425° F., 28 psi, and five seconds dwell time). The unmodified copolyester has a melt viscosity of 315,000 cp at 220° C. and 1000 $sec^{-1}$ and a bond T-peel strength of Kodel polyester/cotton fabric of 19.1 pounds per inch width (bond heatsealed at 425° F. 28 psi, and ten seconds dwell time).

EXAMPLE 8

The procedure of Example 1 is repeated except 40.50 g of the copolyester described in Example 7 and 4.50 g of substantially amorphous polypropylene (1500 cp. at 190° C.) are used to prepare the blend. The blend has a melt viscosity of 55,200 cp at 220° C. and 1000 $sec^{-1}$ and a bond T-peel strength on Kodel polyester/cotton fabric of 16.8 pounds per inch width (bond heatsealed at 425° F., 28 psi, and five seconds dwell time).

EXAMPLE 9

The copolyester described in Example 1 and 5 weight percent substantially amorphous poly-1-butene (melt viscosity 5,000 cp at 190° C.) are melt blended using the procedure of Example 1. The blend has a melt viscosity of 48,000 cp at 220° C. and its bonding properties are similar to that of the blend described in Example 1. Similarly good results are obtained when 5 weight percent of an amorphous 90/10 1-butene/propylene copolymer having a melt viscosity of 6200 cp at 190° C. is used instead of the amorphous poly-1-butene.

EXAMPLE 10

The copolyester described in Example 1 and 15 weight percent of substantially amorphous 60/40 propylene/1-butene copolymer having a melt viscosity of 30,000 cp at 190° C. are melt blended according to the procedure of Example 1. The blend has a melt viscosity of 55,000 cp at 220° C. and its bonding properties are similar to that of the blend described in Example 1.

Similarly good results are obtained when 15 weight percent of substantially amorphous 50/50 propylene/1-hexene copolymer having a melt viscosity of 25,000 cp at 190° C. is used instead of the propylene/1-butene copolymer.

EXAMPLE 11

Substantially amorphous polypropylene (1500 cp. at 190° C.) is ground in the presence of dry ice with a Wiley Mill grinder to pass a 0.25 inch screen. Before the ground amorphous polypropylene is allowed to return to ambient temperature, it is dusted with talc to prevent blocking. The dusted substantially amorphous polypropylene (113.5 g) is then dry blended with pellets of the copolyester described in Example 1 (2156.5 g). The dry blend is then melt blended in a Brabender extruder at 200° C., extruded into a rod, and chopped into ¼ inch pellets. No difficulties were experienced in pelletizing this blend.

The resulting blend is then applied to concrete and asphalt highway surfaces with a small hand-held extruder (barrel temperature about 500° F.) manufactured by the Possis Corporation. A small butane torch was used to dry the road surfaces prior to application of the adhesive. Within 20 seconds after adhesive application, a polycarbonate reflective highway marker is pressed into the adhesive. The highway markers are well bonded to the highway surfaces.

The novel hot-melt adhesives of this invention can be dispersed by means of conventional hot-melt applicators. These hot melt adhesives can be used to bond a wide variety of substrates such as fabric, metal, glass, wood, rubber, plastic sheets, paper, cardboard and many other materials.

Although the invention has been described in considerable detail with particular reference to certain preferred embodiments thereof, variations and modifications can be effected within the spirit and scope of the invention.

We claim:

1. An adhesive composition capable of being used as a hot melt adhesive comprising a blend of about 1 to 20 percent by weight of at least one substantially amorphous polyolefin and at least one polyester having a heat of fusion of about 1 to about 12 calories per gram, a melting point within the range of about 80° C. to 225° C., and an inherent viscosity of at least 0.5 as measured at 25° C., using 0.50 gram of polyester per 100 ml. of a solvent consisting of 60 percent by volume phenol and 40 percent by volume tetrachloroethane, wherein said substantially amorphous polyolefin is a member of the group selected from substantially amorphous homopolymers of 1-olefins containing 3 to 5 carbon atoms, substantially amorphous copolymers prepared from ethylene and 1-olefins containing 3 to 5 carbon atoms, substantially amorphous copolymers prepared from propylene and 1-butene, substantially amorphous copolymers prepared from amorphous propylene and a higher 1-olefin containing less than 65 mole percent of at least one higher 1-olefin of the group consisting of 1-hexene, 1-heptene, 1-octene, 1-nonene and 1-decene, and substantially amorphous copolymers prepared from 1-butene and a higher 1-olefin containing less than 65 mole percent of at least one higher 1-olefin of the group consisting of 1-hexene, 1-heptene, 1-octene, 1-nonene and 1-decene.

2. An adhesive composition according to claim 1 wherein said substantially amorphous polyolefin is amorphous polypropylene.

3. An adhesive composition according to claim 1 wherein said substantially amorphous polyolefin is amorphous poly 1-butene.

4. An adhesive composition according to claim 1 wherein said substantially amorphous polyolefin is amorphous poly 1-pentene.

5. An adhesive composition according to claim 1 wherein said substantially amorphous polyolefin is at least one amorphous copolymer prepared from ethylene and 1-olefins containing 3 to 5 carbon atoms.

6. An adhesive composition according to claim 1 wherein said substantially amorphous polyolefin is at least one amorphous propylene/higher 1-olefin copolymer containing less than 65 mole percent of at least one higher 1-olefin of the group consisting essentially of 1-hexene, 1-heptene, 1-octene, 1-nonene and 1-decene.

7. An adhesive composition according to claim 1 wherein said substantially amorphous polyolefin is at least one propylene/1-butene copolymer.

* * * * *

UNITED STATES PATENT AND TRADEMARK OFFICE
CERTIFICATE OF CORRECTION

PATENT NO. : 4,146,586
DATED : March 27, 1979
INVENTOR(S) : Richard L. McConnell, Jimmy R. Trotter, Frederick B. Joyner It is certified that error appears in the above-identified patent and that said Letters Patent are hereby corrected as shown below:

Column 8, line 24, the word "amorphous" should be deleted.

*Signed and Sealed this*

*Twenty-sixth* Day of *June 1979*

[SEAL]

Attest:

RUTH C. MASON
*Attesting Officer*

DONALD W. BANNER
*Commissioner of Patents and Trademarks*